US012659701B2

(12) United States Patent
McCann et al.

(10) Patent No.: US 12,659,701 B2
(45) Date of Patent: Jun. 16, 2026

(54) DEVICES AND METHODS FOR WLAN ENHANCED BROADCAST SERVICES

(71) Applicant: Huawei Technologies Co., Ltd., Shenzhen (CN)

(72) Inventors: Stephen McCann, Munich (DE); Michael Montemurro, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 18/599,559

(22) Filed: Mar. 8, 2024

(65) Prior Publication Data

US 2024/0214778 A1 Jun. 27, 2024

Related U.S. Application Data

(63) Continuation of application No. PCT/EP2021/074945, filed on Sep. 10, 2021.

(51) Int. Cl.
*H04W 4/06* (2009.01)
*H04W 84/12* (2009.01)

(52) U.S. Cl.
CPC .............. *H04W 4/06* (2013.01); *H04W 84/12* (2013.01)

(58) Field of Classification Search
CPC .................................. H04L 12/18; H04W 4/06
See application file for complete search history.

(56) References Cited

U.S. PATENT DOCUMENTS

| | | | | |
|---|---|---|---|---|
| 2015/0381676 A1* | 12/2015 | Seok | ..................... | H04W 76/11 |
| | | | | 370/315 |
| 2023/0026143 A1* | 1/2023 | Patil | ..................... | H04W 72/12 |
| 2023/0028494 A1* | 1/2023 | Patil | ..................... | H04L 1/1685 |

OTHER PUBLICATIONS

The Public Listing for IEEE Standards Registration Authority, http://standards-oui.ieee.org/oui/oui.txt, download on Dec. 25, 2024, 3216 pages.
Hitoshi Morioka et al:"Resolutions for Clause 11.100.2", doc.: IEEE 802.11-21/0239r14, Date: Sep. 7, 2022, 22 pages.
IEEE Standard for Information Technology, Telecommunications and Information Exchange between Systems Local and Metropolitan Area Networks, Specific Requirements, Part 11: Wireless LAN Medium Access Control (MAC) and Physical Layer (PHY) Specifications, IEEE Std 802.11 2020, Dec. 3, 2020, 7524 pages.
IEEE Standard for Local and Metropolitan Area Networks: Overview and Architecture, Amendment 2: Local Medium Access Control (MAC) Address Usage, IEEE Std 802c-2017, Jun. 15, 2017, 26 pages.
P802.11bc/D1.03, Draft Standard for Information technology, Telecommunications and information exchange between systems Local and metropolitan area networks, Specific requirements, Amendment 6: Enhanced Broadcast Services, IEEE P802.11bc/D1.03, May 2021, 78 pages.

* cited by examiner

*Primary Examiner* — Shukri Taha
(74) *Attorney, Agent, or Firm* — Conley Rose, P.C.

(57) ABSTRACT

An access point (AP) is configured to establish an Enhanced Broadcast Services, (EBCS) multicast stream between one or more backend servers and one or more non-AP stations of a wireless local area network (WLAN). The AP comprises a communication interface configured to transmit or receive a frame of the EBCS multicast stream, wherein the frame comprises a content identifier indicative of the EBCS multicast stream, an EBCS MAC address indicative of the frame being an EBCS frame, and a multicast address indicative of the frame being a multicast frame.

20 Claims, 4 Drawing Sheets

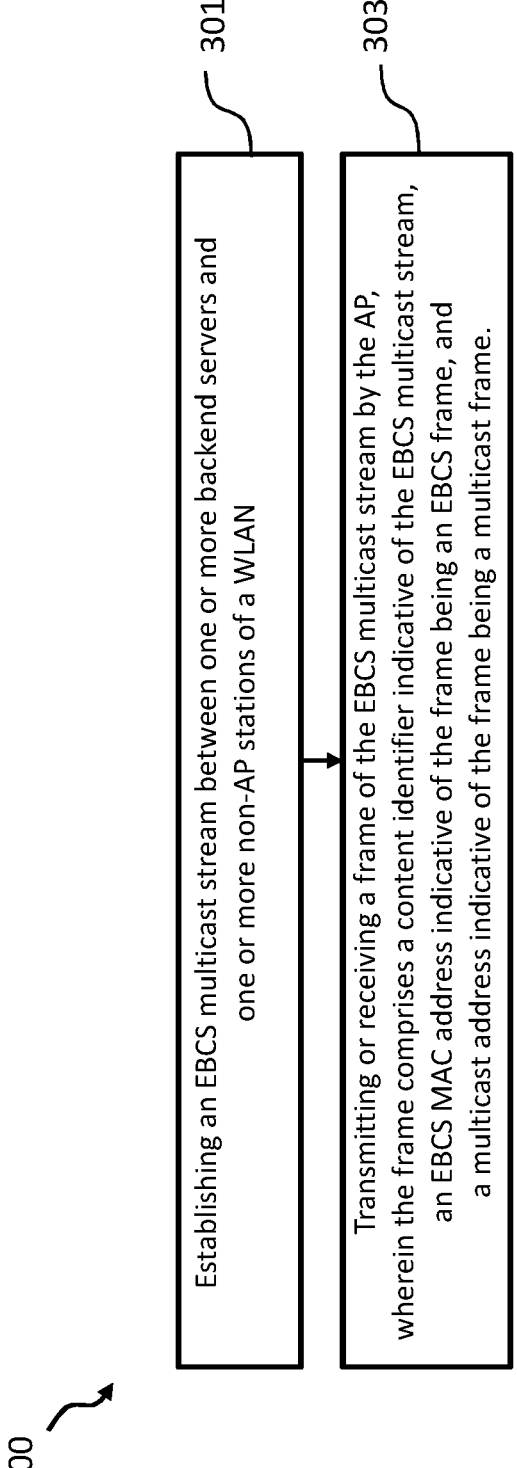

300

301

Establishing an EBCS multicast stream between one or more backend servers and one or more non-AP stations of a WLAN

303

Transmitting or receiving a frame of the EBCS multicast stream by the AP, wherein the frame comprises a content identifier indicative of the EBCS multicast stream, an EBCS MAC address indicative of the frame being an EBCS frame, and a multicast address indicative of the frame being a multicast frame.

FIG. 3

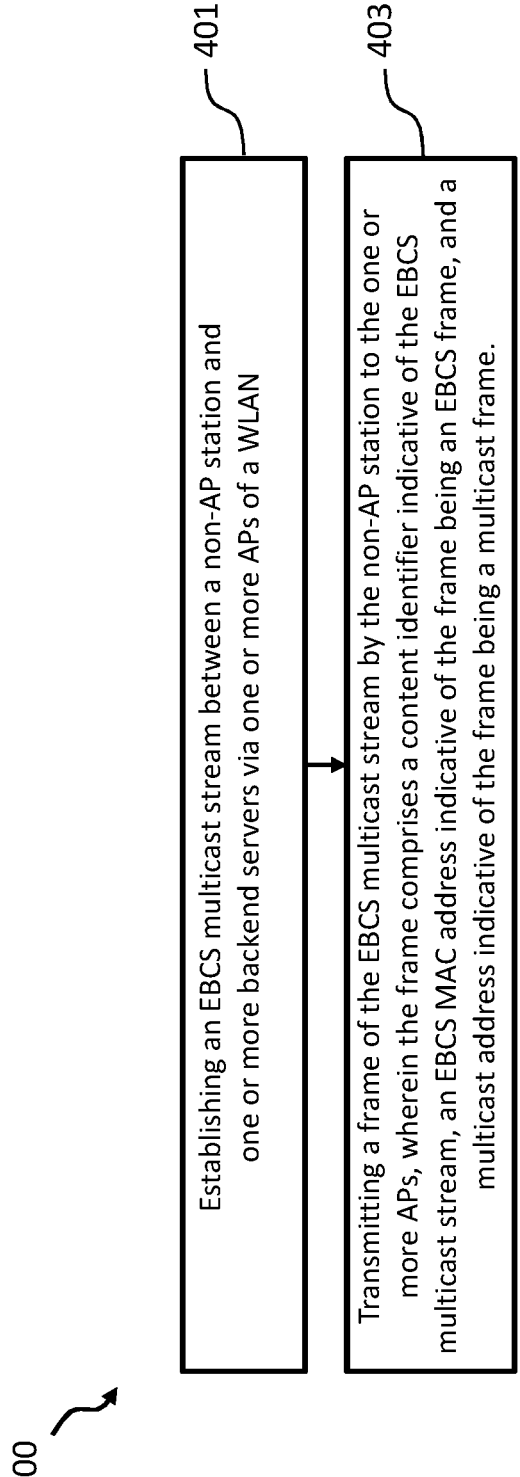

401

Establishing an EBCS multicast stream between a non-AP station and one or more backend servers via one or more APs of a WLAN

403

Transmitting a frame of the EBCS multicast stream by the non-AP station to the one or more APs, wherein the frame comprises a content identifier indicative of the EBCS multicast stream, an EBCS MAC address indicative of the frame being an EBCS frame, and a multicast address indicative of the frame being a multicast frame.

DEVICES AND METHODS FOR WLAN ENHANCED BROADCAST SERVICES

CROSS-REFERENCE TO RELATED APPLICATIONS

This application is a continuation application of International Patent Application No. PCT/EP2021/074945, filed on Sep. 10, 2021, which is hereby incorporated by reference in its entirety.

TECHNICAL FIELD

The present disclosure relates to wireless communications. More specifically, the present disclosure relates to devices and methods for wireless local area network (WLAN) Enhanced Broadcast Services.

BACKGROUND

Institute of Electrical and Electronics Engineers (IEEE) 802.11-based WLANs have become popular at an unprecedented rate. WLANs support a variety of data transfer modes including (but not only) file transfer, emails, web browsing and real-time applications such as audio and video applications.

Within the IEEE 802.11 standardization project, the IEEE 802.11bc task group (TG) is developing Enhanced Broadcast Services (EBCS) for IEEE 802.11 technology. IEEE 802.11bc provides an uplink EBCS mode, wherein a station (STA) (also referred to as a device) can operate in transmit-only mode to broadcast traffic streams to an access point (AP) infrastructure without being associated (or connected) to the local area network (LAN) network offered by the WLAN infrastructure (WLAN APs). IEEE 802.11bc also has a downlink EBCS mode, wherein an AP infrastructure can broadcast traffic streams to STAs whether they are associated (connected) or un-associated to the AP. In the base 802.11 standard, the ability exists for associated STAs to receive a broadcast service stream transmitted through a local area network (LAN). However, the source of the broadcast traffic stream may not be a device connected to the AP infrastructure and therefore does not work with the existing base 802.11 standard. WLAN infrastructure that is legacy enhanced broadcast services capable can concurrently provide LAN access to legacy clients while offering enhanced broadcast services to clients whether they are associated or not associated.

SUMMARY

It is an objective of the present disclosure to provide improved devices and methods for WLAN Enhanced Broadcast Services.

The foregoing and other objectives are achieved by the subject matter of the independent claims. Further implementation forms are apparent from the dependent claims, the description and the figures.

Generally, devices and methods disclosed herein address the problem that the current 802.11 base line definition/rules for addressing of traffic streams only apply to LAN traffic that is only accessible to associated STAs. The addressing provided by embodiments disclosed herein support ECBS traffic streams as well. Unlike LAN broadcast traffic, EBCS traffic streams are not basic service set (BSS) traffic, so the addressing is updated to differentiate from LAN traffic. Defining specific addressing requirements for EBCS traffic streams allows STAs and APs receiving the traffic to filter based on the EBCS content of interest.

Embodiments disclosed herein are based on the idea that a switch or router component of the AP (co-located or connected to the AP) is configured to know that the A3 address of a header of a WLAN medium access control (MAC) frame is a special address for EBCS traffic. The A1 and A2 address settings define the specific traffic stream and the A3 address in the header identifies the traffic as an EBCS stream. When the A3 special address is encountered, the switch or router component of the AP identifies that the traffic is EBCS traffic and is routed to a destination/source that is configured within the AP. The A3 address is re-defined as a new value for EBCS traffic when not accessing a LAN.

In an example, according to a first aspect an access point, AP, configured to establish or support an Enhanced Broadcast Services, EBCS, multicast stream between one or more backend servers and one or more non-AP stations of a wireless local area network, WLAN is provided. The one or more non-AP stations may comprise one or more non-AP stations associated with the AP and/or one or more non-AP stations not associated with the AP. The AP comprises a communication interface configured to transmit or receive a frame of the EBCS multicast stream, wherein the frame, e.g. a frame header comprises, i.e. encodes a content identifier (also referred to as content ID) indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

In a further possible implementation form, the frame is an 802.11 MAC frame, i.e. a MAC frame in accordance with the IEEE 802.11 standard, comprising a MAC frame header with a first bit sequence defining a first MAC address field, a second bit sequence defining a second MAC address field, and a third bit sequence defining a third MAC address field.

In a further possible implementation form, the first MAC address field comprises the multicast address and the third MAC address field comprises the EBCS MAC address.

In a further possible implementation form, the first MAC address field comprises the EBCS MAC address and the third MAC address field comprises the multicast address.

In a further possible implementation form, the second MAC address field comprises a MAC address of the AP or a MAC address of the one or more non-AP stations.

In a further possible implementation form, the frame further comprises a ToDS bit and a FromDS bit and wherein different settings of the ToDS bit and the FromDS bit are indicative of the first MAC address field comprising the EBCS MAC address or the multicast address and/or indicative of the third MAC address field comprising the EBCS MAC address or the multicast address.

In a further possible implementation form, the EBCS MAC address of the frame is a bit sequence from a pool, in particular a range of pre-defined reserved bit sequences.

In a further possible implementation form, the pool of pre-defined reserved bit sequences comprises a range of addresses from a standard assigned identifier (SAI) quadrant of the structured local address plan (SLAP) defined by IEEE 802c-2017.

In a further possible implementation form, the pool of pre-defined reserved bit sequences comprises one or more addresses in a range from the hexadecimal numbers 70 0F AC 00 00 00 to 70 0F AC FF FF FF.

In a further possible implementation form, the pool of pre-defined reserved bit sequences comprises at least one bit sequence indicative of the EBCS frame being an emergency EBCS frame.

In a further possible implementation form, the AP further comprises a processing circuitry configured to generate the frame and the communication interface is configured to transmit the frame to the one or more non-AP stations.

In a further possible implementation form, the communication interface is further configured to receive a communication frame from the one or more EBCS backend servers and the processing circuitry is configured to generate the frame, in response to receiving the communication frame from the one or more EBCS backend servers.

In a further possible implementation form, the communication frame further comprises, i.e. encodes information indicative of one or more MAC addresses of the one or more non-AP stations.

In a further possible implementation form, the communication interface is configured to receive the frame from the one or more non-AP stations and the AP further comprises a processing circuitry configured to extract, i.e. parse the content ID, the EBCS MAC address, and the multicast address from the frame.

In a further possible implementation form, the third MAC address field of the frame further comprises, i.e. encodes information indicative of a MAC address of the one or more EBCS backend servers.

In a further possible implementation form, the processing circuitry is configured to determine one or more MAC addresses of the one or more EBCS backend servers based on the information of the third MAC address field of the frame.

According to a second aspect a method of operating an access point, AP is provided. The method comprises a step of establishing an Enhanced Broadcast Services, EBCS, multicast stream between one or more backend servers and one or more non-AP stations of a wireless local area network, WLAN. The one or more non-AP stations may comprise one or more non-AP stations associated with the AP and/or one or more non-AP stations not associated with the AP. The method comprises a further step of transmitting or receiving a frame of the EBCS multicast stream by the AP, wherein the frame, e.g. the frame header comprises, i.e. encodes a content ID indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

The method according to the second aspect of the present disclosure can be performed by the AP according to the first aspect of the present disclosure. Thus, further features of the method according to the second aspect of the present disclosure result directly from the functionality of the AP according to the first aspect of the present disclosure as well as its different implementation forms described above and below.

According to a third aspect, a non-access point, non-AP, station configured to establish an EBCS multicast stream between the non-AP station and one or more backend servers via one or more APs of a wireless local area network, WLAN, is provided. The non-AP station comprises a communication interface configured to transmit a frame of the EBCS multicast stream to the one or more APs, wherein the frame, e.g. the frame header comprises, i.e. encodes a content ID indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

In a further possible implementation form, the frame is an 802.11 MAC frame, i.e. a MAC frame in accordance with the IEEE 802.11 standard comprising a MAC frame header with a first bit sequence defining a first MAC address field, a second bit sequence defining a second MAC address field, and a third bit sequence defining a third MAC address field.

In a further possible implementation form, the first MAC address field comprises the multicast address and the third MAC address field comprises the EBCS MAC address.

In a further possible implementation form, the first MAC address field comprises the EBCS MAC address and the third MAC address field comprises the multicast address.

In a further possible implementation form, the second MAC address field comprises a MAC address of the AP or a MAC address of the one or more APs.

In a further possible implementation form, the frame further comprises a ToDS bit and a FromDS bit and different settings or combinations of the ToDS bit and the FromDS bit are indicative of the first MAC address field comprising the EBCS MAC address or the multicast address and/or indicative of the third MAC address field comprising the EBCS MAC address or the multicast address.

In a further possible implementation form, the EBCS MAC address of the frame is a bit sequence from a pool, in particular a range of pre-defined reserved bit sequences.

In a further possible implementation form, the pool of pre-defined reserved bit sequences comprises a range of addresses from the SAI quadrant of the SLAP defined by IEEE 802c-2017.

In a further possible implementation form, the pool of pre-defined reserved bit sequences comprises one or more addresses in a range from the hexadecimal numbers 70 0F AC 00 00 00 to 70 0F AC FF FF FF.

In a further possible implementation form, the pool of pre-defined reserved bit sequences comprises at least one bit sequence indicative of the EBCS frame being an emergency EBCS frame.

In a further possible implementation form, the non-AP station further comprises a processing circuitry configured to generate the frame and the communication interface is configured to transmit the frame to the one or more APs.

According to a fourth aspect a method of operating a non-access point, non-AP, station is provided. The method comprises a step of establishing an EBCS multicast stream between the non-AP station and one or more backend servers via one or more APs of a WLAN. The method comprises a further step of transmitting a frame of the EBCS multicast stream by the non-AP station to the one or more APs, wherein the frame, e.g. the frame header comprises, i.e. encodes a content ID indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

The method according to the fourth aspect of the present disclosure can be performed by the non-AP station according to the third aspect of the present disclosure. Thus, further features of the method according to the fourth aspect of the present disclosure result directly from the functionality of the non-AP station according to the third aspect of the present disclosure as well as its different implementation forms described above and below.

According to a fifth aspect a computer program product is provided, comprising a computer-readable storage medium for storing program code which causes a computer or a processor to perform the method according to the second aspect or the method according to the fourth aspect, when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 3 is a flow diagram illustrating a method of operating an access point, AP, according to an embodiment; and FIG. 4 is a flow diagram illustrating a method of operating a non-access point, non-AP, station according to an embodiment.

Figure 1:
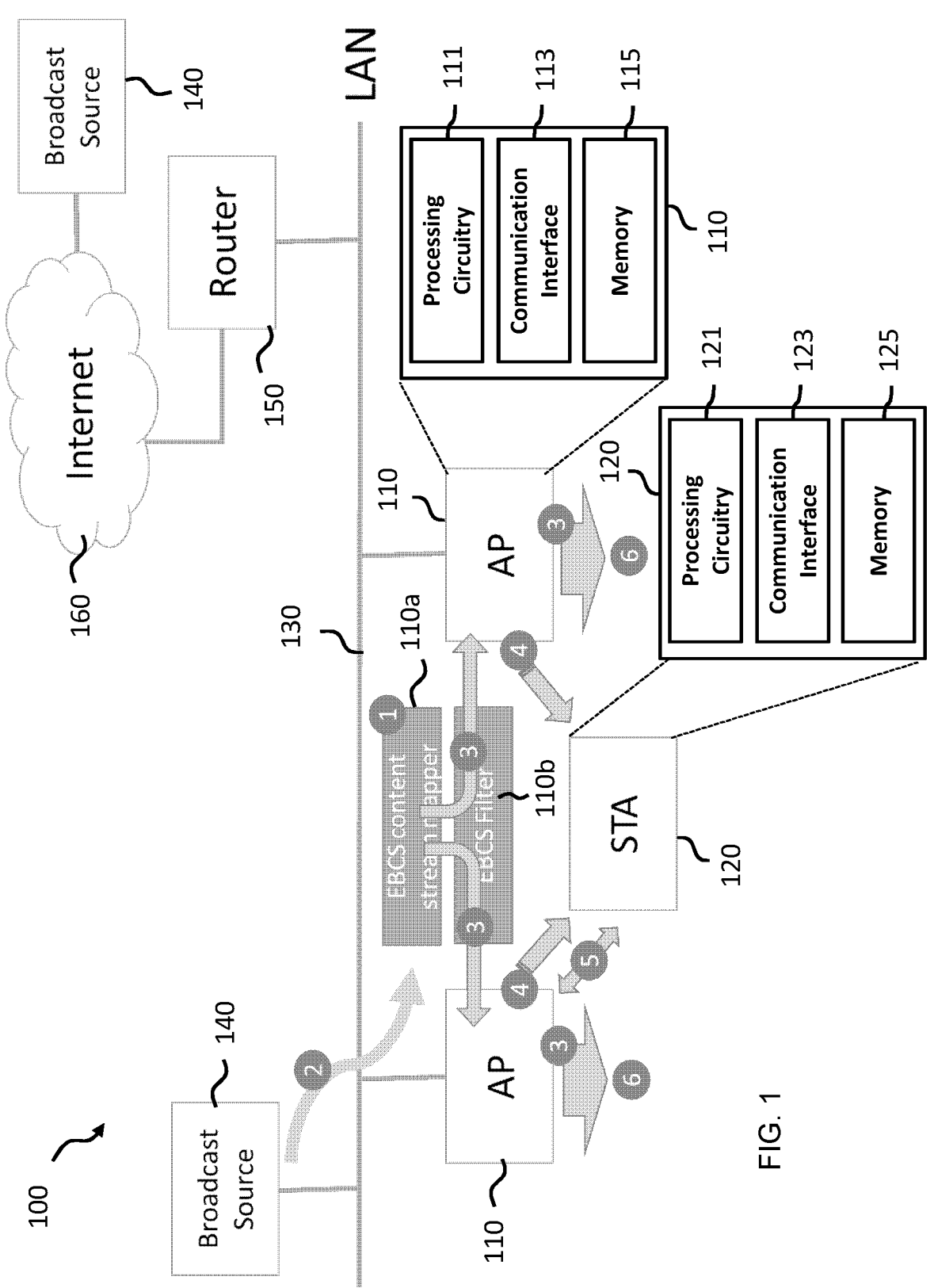
FIG. 1 shows an exemplary communication system including an AP according to an embodiment and a non-AP station according to an embodiment for providing EBCS in a downlink mode.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, aspects of embodiments of the present disclosure or aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Before describing embodiments of the present disclosure, in the following some technical background as well as terminology concerning wireless networks and devices in accordance with the IEEE 802.11 WLAN standard will be introduced under reference to FIGS. 1 to 4 (e.g. FIG. 1 to 4). In the following one or more of the following acronyms may be used:

AAI Administratively Assigned Identifier
ANQP Access Network Query Protocol
AP access point
BCAST broadcast address
BSS basic service set
BSSID basic service set identifier
CID company identifier
DA destination address
EBCS enhanced broadcast services
ELI extended local identifier
ESS extended service set
G/W gateway
IEEE Institute of Electrical and Electronic Engineers
LAN local area network
MCAST multicast address
OUI Organizationally Unique Identifier
QMF quality-of-service management frame
SA source address/security association
SAI standard assigned identifier
SLAP structured local address plan
STA station (an IEEE 802.11 device)
TG task group
WLAN wireless local area network As used herein, an EBCS Request frame may be used by an EBCS non-AP STA to request one or more EBCS traffic streams from its associated AP may contain a content ID indicative of the ID of the EBCS traffic stream being requested.

As used herein, an 802.11 frame uses MAC addresses for routing purposes. MAC addresses are assigned as ordered sequences of bits. The Individual/Group bit is always transferred first and is bit 0 of the MAC address. Bit 47 of the MAC address is always transferred last. The individual/group (U/G) bit defines whether the address is a unicast or multicast address. The universal/local (U/L) bit defines how the address is administered.

As used herein, an 802.11 frame comprises up to 4 address fields and a frame control field. Addresses A1, A2 and A3 are MAC addresses that are used to identify the source, destination, transmitter, and receiver of a particular frame. There are four address fields in the MAC frame format. These fields are used to indicate the BSSID, SA, DA, transmitting/transmitter address (TA), and receiving/receiver address (RA). Conventionally, an uplink frame, for instance, has A1=BSSID (address of the AP), A2=TA=SA, A3=DA, with ToDS=1 and FromDS=0. A1 and A2 are essentially the RA and the TA. For management frames, A3 is the address of the access point in the BSS (BSSID). For data frames, A3 is either the DA for uplink (data) traffic or the SA for downlink traffic. The ToDS and FromDS bit settings define the direction of the traffic.

The known IEEE 802-2014 standard defines parameters which are common to all IEEE 802.x standards such as IEEE 802.11. An example of such a parameter is the MAC address that all IEEE 802 devices use for communication. In 2017, IEEE 802c-2017 was published which introduces a local administrator to administer MAC addresses throughout the local area network (LAN. In IEEE 802c-2017 it is defined that while a local administrator may assign addresses throughout the local range, the optional SLAP specifies different assignment approaches in four specified regions (quadrants) of local MAC address space. Therefore, a local administrator can assign MAC addresses either by using a vendor-specific scheme or the SLAP scheme, which is explained and defined in IEEE 802c-2017.

As will be described in more detail in the following under reference to FIGS. 1 and 2, embodiments disclosed herein provide an AP 110 with a switch or router component configured to identify that the A3 address is a special address for EBCS traffic. The A1 and A2 address settings may define the specific traffic stream and the A3 address in the header of an 802.11 frame identifies the traffic as an EBCS stream. When the A3 special address is encountered, the switch or router component of the AP 110 identifies that the traffic is EBCS traffic and is routed to a destination/source that is configured within the AP 110. Thus, according to embodiments disclosed herein the A3 address of an 802.11 frame is re-defined as a new value for EBCS traffic when not accessing a LAN.

Figure 2:
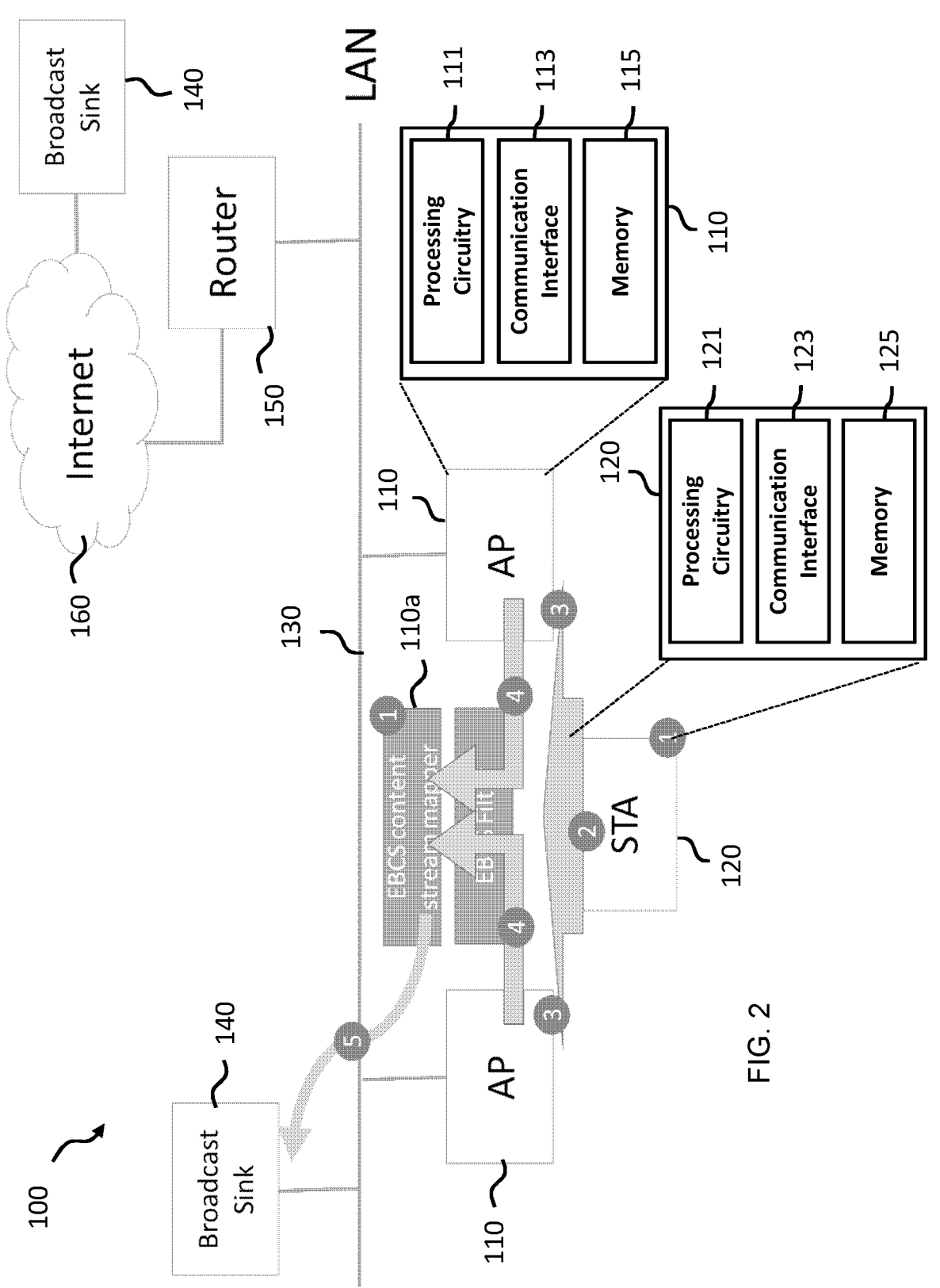
FIG. 2 shows an exemplary communication system including an AP according to an embodiment and a non-AP station according to an embodiment for providing EBCS in an uplink mode.

FIG. 1 shows an exemplary communication system 100 including, by way of example, two APs 110 according to an embodiment and a non-AP station 120 according to an embodiment for providing WLAN EBCS in a downlink mode, while FIG. 2 illustrates the uplink mode. As illustrated in FIGS. 1 and 2, the APs 110 may be connected via a LAN 130 with one or more EBCS backend servers 140, either directly connected with the LAN 130 or via a router 150 and the Internet 160. As will be appreciated, in the EBCS downlink mode shown in FIG. 1 the one or more backend servers 140 are broadcast sources, while the uplink mode shown in FIG. 2 the one or more backend servers 140 are broadcast sinks.

As illustrated in FIGS. 1 and 2, the AP 110 may comprise a processing circuitry 111 and a communication interface 113. The processing circuitry 111 of the AP 110 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The communication interface 113 may comprise a wired and a wireless communication interface configured to exchange data packets with the other nodes of the communication system 100. As illustrated in FIGS. 1 and 2, the AP 110 may further comprise a non-transitory memory 115 configured to store data and executable program code which, when executed by the processing circuitry 111 causes the AP 110 to perform the functions, operations and methods described herein.

Likewise, the non-AP station 120 may comprise a processing circuitry 121 and a communication interface 123. The processing circuitry 121 of the non-AP station may be implemented in hardware and/or software. The hardware may comprise digital circuitry, or both analogue and digital circuitry. Digital circuitry may comprise components such as ASICs, FPGAS, DSPs, or general-purpose processors. The communication interface 123 may comprise a wireless communication interface configured to exchange data with the APs 110. As illustrated in FIGS. 1 and 2, the non-AP station 120 may further comprise a non-transitory memory 125 configured to store data and executable program code which, when executed by the processing circuitry 121 causes the non-AP station 120 to perform the functions, operations and methods described herein.

As will be described in more detail below, the AP 110 is configured to establish and support an Enhanced Broadcast Services, EBCS, multicast stream between the one or more backend servers 140 and the non-AP station 120. In an embodiment, the non-AP station 120 may be or may be not associated with the AP 110. The communication interface 113 of the AP is configured to transmit or receive a frame of the EBCS multicast stream, wherein the frame, e.g. the frame header comprises, i.e. encodes a content identifier (also referred to as content ID) indicative of the identity of the EBCS multicast stream, an EBCS MAC address indicative of the frame being an EBCS frame (and may be also indicative of an address of a destination, i.e. sink of the EBCS multicast stream), and a multicast address indicative of the frame being a multicast frame. In an embodiment, the frame is an 802.11 MAC frame comprising a first MAC address field, a second MAC address field, and a third MAC address field.

Likewise, the non-AP station 120 is configured to establish an EBCS multicast stream between the non-AP station 120 and the one or more backend servers 140 via the one or more APs 110. The communication interface 123 of the non-AP station 120 is configured to transmit a frame of the EBCS multicast stream to the one or more APs 110, wherein the frame, e.g. the frame header comprises, i.e. encodes a content ID indicative of the identity of the EBCS multicast stream, an EBCS MAC address indicative of the frame being an EBCS frame (and may be also indicative of an address of a destination, i.e. sink of the EBCS multicast stream), and a multicast address indicative of the frame being a multicast frame. In an embodiment, the frame is an 802.11 MAC frame comprising a first MAC address field, a second MAC address field, and a third MAC address field.

For the EBCS downlink mode shown in FIG. 1 the AP 110 and the non-AP station 120 are configured to perform the following processing stages illustrated in FIG. 1.

In a processing stage "1" a network administrator may configure a multicast stream for EBCS by assigning a content ID and EBCS MAC address in an EBCS Content Stream Mapper 110a and EBCS Filter 110b. In an embodiment, the EBCS Content Stream Mapper 110a and EBCS Filter 110b may be provided by the processing circuitry 111 of the AP 110.

In a processing stage "2" multicast Stream packets are received by the EBCA Content Stream Mapper 110a and converted to EBCS frames (an EBCS Traffic Stream) according to embodiments disclosed herein containing a Multicast address, Content ID and EBCS MAC address.

In a processing stage "3" the EBCS Filter 110b passes the EBCS frame to the communication interface 113 of the AP 110, which transmits the frame over-the-air, OTA. At the same time as stages "2" and "3", the AP 110 may advertise in a processing stage "4" EBCS Content in 802.11 Beacons, Probe Response and ANQP frames (e.g. an ANQP request and an ANQP response frame).

In a processing stage "5" the STA 120 discovers the EBCS content advertised by the AP 110 and subscribes to receive the EBCS traffic stream.

In a processing stage "6" the STA 120 begins receiving EBCS frames from the AP 110 in range that is broadcasting that stream based on the EBCS MAC address, Content ID, and Multicast address. As will be appreciated, the STA 120 may move from AP to AP and continue to receive the broadcast.

For the EBCS uplink mode shown in FIG. 2 the AP 110 and the non-AP station 120 are configured to perform the following processing stages illustrated in FIG. 2.

In a processing stage "1" a network administrator or manufacturer configures the multicast stream in both the STA 120 and the AP 110 as EBCS by assigning a Content ID and EBCS MAC address in the EBCS Content Stream Mapper 110*a* and the EBCS Filter 110*b*. In an embodiment, the destination address configured on the AP 110 may be the address of the Broadcast Sink or a multicast address.

In a processing stage "2" the STA 120 begins broadcasting EBCS frames according to the embodiments disclosed herein containing a EBCS MAC address, Content ID, and Multicast Address.

In a processing stage "3" the EBCS frames are received by the communication interface 113 of the AP 110, identified as EBCS frames, and passed to the EBCS Filter 110*b* and the EBCS Content Mapper 110*a*.

In a processing stage "4" the EBCS Filter 110*b* and the EBCS Content Stream Mapper 110*a* of the AP 110 match the frame against the configured information. As will be appreciated, duplicate frames may be received if the frame was received by multiple APs 110. In an embodiment, the AP 110 may be configured to remove these duplicates.

In a processing stage "5" the EBCS Content Stream Mapper 110*a* of the AP forwards the frame as multicast or broadcast to the Broadcast Sink address (e.g. the one or more backend servers 140) depending on the configuration for that EBCS traffic stream.

In the following further embodiments implementing the EBCS MAC address in different ways are described in more detail.

According to an embodiment, reserved EBCS MAC address may be allocated in the SAI quadrant for SLAP (IEEE 802c-2017, 8.4.4.2). The number of reserved addresses can vary from 1 to indicate the use of EBCS traffic to many, where a range of SAI addresses are allocated for multiple EBCS traffic streams. For example, 2 addresses may be allocated to indicate uplink and downlink traffic. Such a range of addresses is referred to as a pool and these could be assigned from the SAI quadrant.

An example of a pool of addresses can be constructed as follows. The IEEE 802.11 OUI (00-0F-AC) is used as the top part of a 6 octet address within a SAI address range. This forms a large address pool that is unique to standards defined IEEE 802.11 addresses.

The 3 octets of the 802.11 OUI (00-0F-AC) are exclusive or (ed) (XORed) with the individual/group (I/G), universal/ local (U/L) and SAI bits of the MAC address. As the typical bit settings for I/G, U/L, Y and Z SAI bits are 0111 respectively, this means the first octet is 70. Then the 2 and 3rd octets of the 802.11 OUI value are used resulting in a MAC address range from "70 OF AC 00 00 00" to "70 0F AC FF FF FF".

This is then a universal pool of addresses for IEEE 802.11 use. As will be appreciated, the I/G bit top bit settings do not need to be set as a multicast address. However, it is also prudent to consider this situation, in which case the top octet of the MAC address range would then be "F0" rather than "70", as bit 0 is now set to 1.

A further alternative is that the 1st octet of 70 is then followed by the 802.11 OUI (in other words without the XORing), leaving 2 octets for the EBCS MAC addresses "70 00 0F AC 00 00" to "70 00 0F AC FF FF".

As an alternative to using the SAI quadrant of assigned addresses, EBCS could also use global multicast addresses by requesting a new address (or a range of addresses) from the IEEE Registration Authority Committee (RAC). This EBCS MAC address can be assigned to the A3 address of the MAC header together with the ToDS and FromDS bits depending on whether the broadcast is uplink or downlink.

In addition to the A3 address, the A1 address can also be used to identity the specific stream that is being broadcast. This may be useful in the situation where multiple broadcast streams are being transmitted at the same time.

There are many ways in which a new A3 and A1 address can be assigned, depending on how generic the A3 is. If the A3 address is only a single new value within a system, the A1 address then can be used as an identifier for the broadcast stream. Additionally, the A1 and A3 addresses can be interchanged, as long as the A3 address is unique to EBCS.

EBCS MAC addresses may be assigned on a deployment basis, so that many WLANs within a single area or location share a pool of EBCS MAC addresses administered from a central point.

Regarding the EBCS Content ID, some of the lower octets of the EBCS MAC address (or indeed all of the octets) could be assigned to the Content ID, especially when a range of EBCS MAC addresses are used to identify individual traffic streams. Therefore, you could remove the Content ID and just use the EBCS MAC address as an identifier.

Table 1 below shows an example allocation of addresses for the A1, A2 and A3 addresses.

TABLE 1

| EBCS Address as an A3 address | | | | | |
|---|---|---|---|---|---|
| Direction | A1 (RA) | A2 (TA) | A3 | ToDS | FromDS |
| UL | MCAST | STA | EBCS MAC address | 1 | 0 |
| DL | MCAST | AP MAC address | EBCS MAC address | 0 | 1 |

The A2 address (e.g., TA) is assigned to either the STA 120 or AP 110 MAC address. As will be appreciated, different from other approaches is the AP MAC address replaces the "BSSID". However, in practice the actual address of the AP 110 and the BSSID is usually the same.

The A3 address is assigned as an EBCS MAC address and this is either a SAI multicast address or a global multicast address. This indicates to the switch/router component of the AP 110 that the frame is an EBCS frame and has to be routed in a different way from conventional IEEE 802.11 frames.

The A1 address is assigned as a multicast address for the specific broadcast stream, so that traffic for different streams transmitted simultaneously can be identified. This address is assigned by an application or derived from a higher layer multicast IP address.

Table 2 shows a further example allocation of addresses for the A1, A2 and A3 addresses.

TABLE 2

| EBCS Address as an A1 address | | | | | |
|---|---|---|---|---|---|
| Direction | A1 (RA) | A2 (TA) | A3 | ToDS | FromDS |
| Uplink (UL) | EBCS MAC address | STA | MCAST | 1 | 0 |
| Downlink (DL) | EBCS MAC address | AP MAC address | MCAST | 0 | 1 |

The A2 address (TA) is assigned to either the STA 120 or AP 110 MAC address.

The A3 address is assigned as a MCAST address for the specific broadcast stream, so that traffic for different streams transmitted simultaneously can be identified. This indicates to the switch/router component of the AP 110 that the frame is an EBCS frame and has to be routed in a different way from conventional IEEE 802.11 frames. This address could be assigned by the IEEE Registration Authority. Alternatively, it could be configured from a range of MAC addresses assigned by the IEEE registration authority and selected by the source of the EBCS broadcast.

The A1 address is assigned as an EBCS MAC address and this is either a SAI multicast address or a global multicast address.

The following tables show some other possible assignments of the A1 and A3 addresses.

TABLE 3

| | EBCS Address as an A1 address (further embodiment) | | | | |
|---|---|---|---|---|---|
| Direction | A1 (RA) | A2 (TA) | A3 | ToDS | FromDS |
| UL | EBCS_UL | STA | MCAST | 0 | 0 |
| DL | EBCS_DL | AP MAC Address | MCAST | 0 | 0 |

In Table 3, the A3 address is assigned as a MCAST (address for the specific broadcast stream, so that traffic for different streams transmitted simultaneously can be identified. This indicates to the switch/router component of the AP 110 that the frame is an EBCS frame and has to be routed in a different way from the conventional IEEE 802.11 frames.

The A1 address is assigned as an EBCS_UL (uplink) or EBCS_DL (downlink) address, which differ from each other and these are either SAI multicast or a global multicast addresses.

Although Table 3 shows that the ToDS/FromDS bits are all 0, this is just an alternative situation that may occur. The addressing and solution described herein is independent of these two bits settings.

TABLE 4

| | EBCS Address as an A3 address | | | | |
|---|---|---|---|---|---|
| Direction | A1 (RA) | A2 (TA) | A3 | ToDS | FromDS |
| UL | BCAST | STA | EBCS_ST1 | 1 | 0 |
| DL | BCAST | AP MAC Address | EBCS_ST2 | 0 | 1 |

In Table 4, the A3 address is assigned to the EBCS MAC addresses EBCS_ST1 (which may be derived by combining the first three octets of the EBCS MAC address with the content ID) and EBCS_ST2 that in turn are assigned by an EBCS Service to the STA 120 transmitting or receiving a broadcast (a block of EBCS MAC addresses would be reserved).

Address 1 is set to the Broadcast address and the A3 address is set to a MAC address (e.g. EBCS_ST2) to uniquely define the traffic stream. Each EBCS traffic stream would be configured to advertise a traffic stream. In this particular case, the ToDS/FromDS bits could be used to indicate whether the EBCS traffic stream is uplink or downlink.

TABLE 5

| | EBCS Address as an A3 address | | | | |
|---|---|---|---|---|---|
| Direction | A1 (RA) | A2 (TA) | A3 | ToDS | FromDS |
| UL | BCAST | STA | EBCS_ST1 | 0 | 0 |
| DL | BCAST | AP MAC Address | EBCS_ST2 | 0 | 0 |

In Table 5, the allocation of addresses is the same as in Table 4. However, in this case the ToDS and FromDS bits are set to 0 to show an example of an alternative situation. The directionality of the traffic stream (UL or DL) would be configured as a property of the MAC address used to identify the EBCS traffic stream (e.g. EBCS_ST2 identifies an EBCS DL traffic stream).

TABLE 6

| | EBCS Address as an A3 address | | | | |
|---|---|---|---|---|---|
| Direction | A1 (RA) | A2 (TA) | A3 | ToDS | FromDS |
| UL | MCAST | STA | EBCS_UL | 0 | 0 |
| DL | MCAST | AP MAC Address | EBCS_DL | 0 | 0 |

In Table 6, the EBCS Address assigned to A3 may be different depending on whether is an uplink (EBCS_UL) or downlink (EBCS_DL) frame.

The A1 address is assigned as a multicast address for the specific broadcast stream, so that traffic for different streams transmitted simultaneously can be identified. The MCAST address is derived or configured for the traffic stream.

The ToDS and FromDS bits are set to 0 as an example. They may also be set to other values.

In an embodiment, one or more of the EBCS MAC address assignments described may also require to be cleared down due to various reasons such as: (i) all EBCS traffic streams have stopped; (ii) a specific EBCS traffic stream has stopped; and/or (iii) a used address has expired its validity. In an embodiment, EBCS MAC addresses may have a requirement to be cleared down, so that an allocation of a limited number of addresses (e.g. from the SAI quadrant) is not exhausted, especially when the management of EBCS MAC addresses may be across a large WLAN deployment.

In the event of an emergency situation arising either from a specific STA 120 (e.g. a user's cell phone, sensor) or a public warning (e.g. regional emergency broadcast), an ECBS address may be allocated a special emergency value. The allocation of this emergency address may be done on a regional basis (e.g. allocated by a regional authority for emergency purposes), or a local basis (e.g. within a conference center or sports stadium). Once the emergency broadcast has been completed, the emergency address is not used for conventional EBCS traffic. An example of such an emergency address based on the earlier address pool example may be "70 0F AC FF FF FF".

FIG. 3 shows steps of a method 300 of operating the AP 110 according to an embodiment. The method 300 comprises a step 301 of establishing an Enhanced Broadcast Services, EBCS, multicast stream between the one or more backend servers 140 and the one or more non-AP stations 120 of a WLAN. Moreover, the method 300 comprises a further step 303 of transmitting or receiving a frame of the EBCS multicast stream by the AP 110, wherein the frame, e.g. the frame header comprises, i.e. encodes a content identifier or content ID indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

FIG. 4 shows steps of a method 400 of operating the non-AP station 120 according to an embodiment. The method 400 comprises a step 401 of establishing an EBCS multicast stream between the non-AP station 120 and the one or more backend servers 140 via the one or more APs 110 of the WLAN. Moreover, the method 400 comprises a step 403 of transmitting a frame of the EBCS multicast stream by the non-AP station 120 to the one or more APs 110, wherein the frame, e.g. the frame header comprises, i.e. encodes a content identifier (also referred to as content ID) indicative of the identity of the EBCS multicast stream, an EBCS MAC address indicative of the frame being an EBCS frame (and optionally also indicative of an address of a destination, i.e. sink of the EBCS multicast stream), and a multicast address indicative of the frame being a multicast frame.

A person skilled in the art will understand that the "blocks" (or "units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments disclosed herein may be integrated into one processing unit, or each of the units may exist alone physically, or two or more units are integrated into one unit.

What is claimed is:

1. An access point (AP) of a wireless local area network, (WLAN), wherein the AP comprises:
   a communication interface configured to transmit or receive a frame of an Enhanced Broadcast Services (EBCS) multicast stream,
   wherein the frame comprises a content identifier that indicates the EBCS multicast stream, an EBCS medium access control (MAC) address that indicates an EBCS frame, and a multicast address that indicates a multicast frame, and wherein the frame is an 802.11 MAC frame comprising a first MAC address field, a second MAC address field, and a third MAC address field.

2. The AP of claim 1, wherein the first MAC address field comprises the multicast address, and wherein the third MAC address field comprises the EBCS MAC address.

3. The AP of claim 1, wherein the first MAC address field comprises the EBCS MAC address, and wherein the third MAC address field comprises the multicast address.

4. The AP of claim 1, wherein the second MAC address field comprises a MAC address of the AP or a MAC address of the one or more non-AP stations.

5. The AP of claim 1, wherein the frame further comprises a ToDS bit and a FromDS bit, wherein different settings of the ToDS bit and the FromDS bit indicate at least one of the first MAC address field comprising the EBCS MAC address or the multicast address or indicate the third MAC address field comprises the EBCS MAC address or the multicast address.

6. The AP of claim 1, wherein the EBCS MAC address of is a bit sequence from a pool of reserved bit sequences.

7. The AP of claim 6, wherein the pool of reserved bit sequences comprises a range of addresses from a standard assigned identifier (SAI) quadrant of a Structured Local Address Plan, (SLAP).

8. The AP of claim 7, wherein the pool of reserved bit sequences comprises one or more addresses in a range from a hexadecimal number 70 0F AC 00 00 00 to a hexadecimal number 70 0F AC FF FF FF.

9. The AP of claim 6, wherein the pool of reserved bit sequences comprises at least one bit sequence indicative of the EBCS frame being an emergency EBCS frame.

10. The AP of claim 1, further comprising a processing circuitry coupled to the communication interface and configured to generate the frame, wherein the communication interface is configured to transmit the frame to the one or more non-AP stations.

11. The AP of claim 10, wherein the communication interface is further configured to receive a communication frame from one or more backend servers, and wherein the processing circuitry is configured to further generate the frame based on the communication frame.

12. The AP of claim 11, wherein the communication frame further comprises information that indicates one or more MAC addresses of the one or more non-AP stations.

13. The AP of claim 1, wherein the communication interface is configured to receive the frame from one or more non-AP stations, and wherein the AP further comprises processing circuitry coupled to the communication interface and configured to extract the content identifier, the EBCS MAC address, and the multicast address from the frame.

14. The AP of claim 13, wherein the third MAC address field of comprises information that indicates a MAC address of one or more backend servers.

15. The AP of claim 14, wherein the processing circuitry is further configured to determine one or more MAC addresses of the one or more backend servers based on the information of the third MAC address field.

16. A method comprising:
   establishing, by an access point (AP), an Enhanced Broadcast Services (EBCS) multicast stream between one or more backend servers and one or more non-AP stations of a wireless local area network (WLAN); and
   transmitting or receiving, by the AP, a frame of the EBCS multicast stream,
   wherein the frame comprises a content identifier that indicates the EBCS multicast stream, an EBCS medium access control (MAC) address that indicates an EBCS frame, and a multicast address that indicates a multicast frame, and wherein the frame is an 802.11 MAC frame comprising a first MAC address field, a second MAC address field, and a third MAC address field.

17. The method of claim 16, wherein the first MAC address field comprises the multicast address, and wherein the third MAC address field comprises the EBCS MAC address.

18. The method of claim 16, wherein the first MAC address field comprises the EBCS MAC address, and wherein the third MAC address field comprises the multicast address.

19. A non-access point (non-AP) station of a wireless local area network (WLAN), wherein the non-AP station comprises:

a communication interface configured to transmit a frame of an Enhanced Broadcast Services (EBCS) multicast stream to one or more APs, wherein the frame comprises a content identifier that indicates the EBCS multicast stream, an EBCS medium access control (MAC) address that indicates an EBCS frame, and a multicast address that indicates a multicast frame, and wherein the frame is an 802.11 MAC frame comprising a first MAC address field, a second MAC address field, and a third MAC address field.

20. The non-AP station of claim 19, wherein the first MAC address field comprises the multicast address, and wherein the third MAC address field comprises the EBCS MAC address.

\* \* \* \* \*